United States Patent [19]

Bruch

[11] 3,852,520

[45] Dec. 3, 1974

[54] COLOR VIDEO SIGNAL STORE

[75] Inventor: Walter Bruch, Hannover, Germany

[73] Assignee: Ted-Bildplatten Aktiengesellschaft AEG-Telefunken-Teldec, Zug, Switzerland

[22] Filed: Aug. 25, 1971

[21] Appl. No.: 174,735

[30] Foreign Application Priority Data

Aug. 27, 1970 Germany .................. P 20 42 434.4
July 10, 1971 Germany .................. P 21 34 556.2

[52] U.S. Cl... 178/5.4 CD, 178/6.6 FS, 178/6.6 DD
[51] Int. Cl. .......................... H04n 5/78, H04n 9/32
[58] Field of Search..... 178/6.6 FS, 6.6 DD, 5.4 CD

[56] References Cited

UNITED STATES PATENTS 3,170,031 2/1965 Okamura ..................... 178/6.6 DD
3,564,123 2/1971 Pezirtzoglov .................. 178/6.6 FS
3,586,762 6/1971 Hodge .......................... 178/5.4 CD

*Primary Examiner*—Howard W. Britton
*Attorney, Agent, or Firm*—George H. Spencer et al.

[57] ABSTRACT

An improved method and video signal store of the type wherein track sections of the store which are associated with spatially identical points of successive frames lie adjacent one another. In order to store color picture signals in this manner, during the recording of the color picture signals, identical color signals as regards the basic color involved, the modulation phase, the modulation frequency and the type of modulation are recorded on adjacent track sections. Various techniques are disclosed for achieving this result depending on the type of color signal, i.e., NTSC, PAL, SECAM OR TRIPAL.

25 Claims, 13 Drawing Figures

FIG. 7
→ HALFFRAME; LINE ↓
| LINE | 1 | 2 | 3 | 4 | 5 | 6 | 7 |
|---|---|---|---|---|---|---|---|
| 1 | 0 | | 0 | | π | | 0 |
| 2 | | π | | 0 | | π | |
| 3 | 0 | | π | | 0 | | 0 |
| 4 | | 0 | | π | | π | |
| 5 | π | | 0 | | 0 | | π |
| 6 | | π | | π | | 0 | |
| 7 | 0 | | 0 | | π | | 0 |
| 8 | | π | | 0 | | π | |
| 9 | 0 | | π | | 0 | | 0 |
| 10 | | 0 | | π | | π | |
| 11 | π | | 0 | | 0 | | π |
FIG. 8
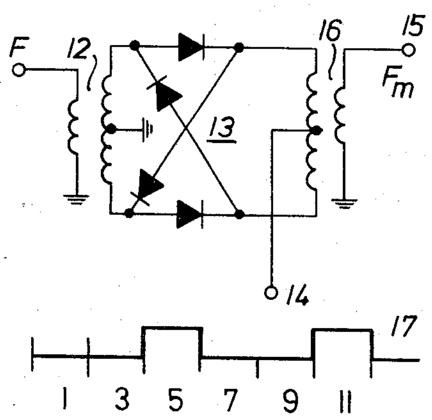
FIG. 9
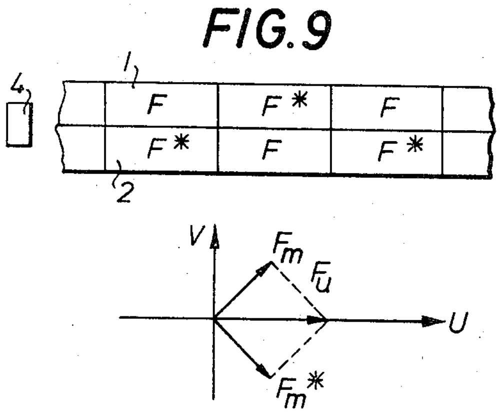
FIG. 10
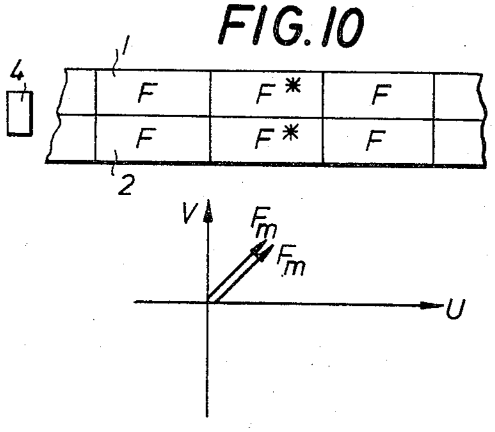
FIG. 11
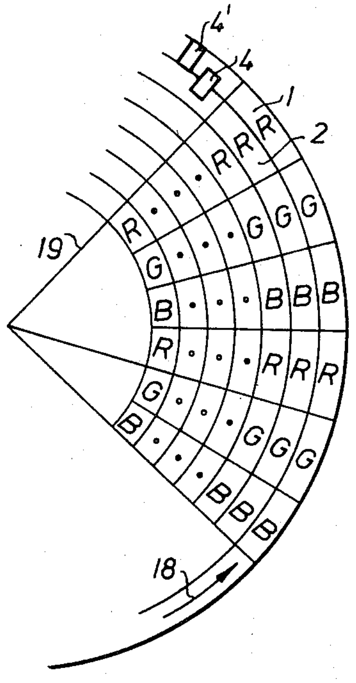

COLOR VIDEO SIGNAL STORE

BACKGROUND OF THE INVENTION

The present invention relates to the recording and storage of color video signals. In particular the present invention relates to an improved technique for the recording and storage of color video signals whereby color errors resulting from misalignment of the pickup during playback are minimized.

It is known to record an electrical picture signal representing an optical image, e.g., a television signal, on a recording carrier in such a manner that different track sections of a continuous track lie next to one another. This is the case, for example, in oblique recording on a magnetic tape under certain circumstances, or on circular recording carrier in which the track has a spiral shape. In any case, the recording is accomplished by modulation of a physical property of the carrier, e.g., either magnetically, optically or mechanically in the form of hills and dales.

It is also known to make the recording in such a manner that track sections which are associated with spatially identical points of an image lie next to one another on the carrier. For example, the track sections for the lines of the same spatial ordinal for consecutive frames or half-frames are always spatially next to one another. In the case of a circular disc-shaped recording carrier, for example, these lines lie next to one another in the radial direction and the line synchronizing pulses are on one radius of the disc. This general type of recording when reproducing black and white video signals has the advantage that no significant errors occur whenever the pickup simultaneously passes over two adjacent tracks or alternates between two tracks because the black and white information of a particular line in a picture does not substantially change from frame to frame or from half-frame to half-frame.

However, if this method is used to record a coded color picture signal, it has been found that errors in the color appear in the reproduced picture. These errors are independent of the configuration of the color picture signal and appear in an NTSC signal, in a SECAM signal, in a PAL signal as well as in a TRIPAL signal. The described recording method is thus not suited for recording a color picture signal.

SUMMARY OF THE INVENTION

It is the object of the present invention to improve the above-described method of recording video signals in such a manner that it is possible to record the color picture signal without the above-mentioned defects.

The present invention is based on a picture signal store having a picture signal recorded along a track in such a manner that track sections assigned to spatially identical points of the picture lie next to one another.

The present invention basically consists in that during the recording of color picture signals identical color signals with respect to the basic color, the modulation phase, the modulation frequency or the type of modulation are recorded on adjacent track sections.

The present invention is based on the realization that all known color television signals have the characteristic that they differ from line to line in some parameter. For the NTSC chrominance subcarrier, the phase of the chrominance subcarrier is shifted from line to line by 180° with respect to the line period, providing a half-line offset. For the SECAM chrominance carrier there also occurs a phase shift between adjacent lines according to a certain predetermined system. The chrominance carrier of the PAL signal has a phase shift based on the quarter-line-offset and on the 25 Hz shift, ane also a change in the PAL switching state from line to line, i.e., the direction of rotation of the modulation. In a TRIPAL signal, the color signals represent different basic colors from line to line. Since now the number of lines of a picture cannot be divided by two or (for TRIPAL) by three, in the above sense adjacent track sections received different color signals. Accordingly, if the pickup simultaneously scans two adjacent track sections or alternates between two adjacent track sections, color distortions appear because the pickup then receives information about or alternatingly scans different types of color signals. It has been found that this simultaneous scanning of an alternating between two adjacent tracks is the cause for the above-described color errors.

The present invention eliminates this drawback in that identical color signals are recorded on adjacent track sections, e.g. the same phase with respect to the line period, the same basic color or the same PAL switching state. If the pickup now simultaneously scans two tracks or alternates between two adjacent tracks, it receives information from identical color picture signals so that no significant errors appear in the reproduced image.

A number of embodiments are disclosed of the specific apparatus required in each of the color systems for modifying the color signals during recording and reproducing thereof so that identical color signals are recorded on adjacent track sections.

According to a further embodiment of the present invention, in a recording in the form of a frequency modulated carrier, the carrier is controlled during each periodically repeated time interval, which time interval corresponds to a constant signal value, to a constant and defined phase with respect to the line period. The FM carrier in this case may be a chrominance subcarrier or a carrier modulated with the entire signal, e.g. the luminance signal Y and the chrominance subcarrier F or only with luminance signal Y or only with the chrominance subcarrier F. With this type of control it is assured that perfect coincidence in frequency and phase of the two recorded FM carriers occurs between adjacently disposed track sections. If the pickup then jumps between these adjacent track sections or simultaneously scans signal components of both track sections, or if the signals of the track sections have been slightly blended during the recording or some other type of crosstalk takes place between these signals, the interference produced thereby remains slight because of the coincidence of frequency and phase.

This type of regulation is accomplished preferably during the line scanning period, e.g., the porch or the sync pulse. The constant signal value is preferably the black value or an ultrablack value. The control voltage is applied to a memory circuit which insures that the control voltage effective at the input of the FM modulator becomes fully effective during the above-mentioned periodic time interval. To achieve this result, the memory circuit has a low charging time constant or can quickly take up a new value and then maintains this value during the periodic time interval, e.g., during the line scanning period. Such a memory circuit can be realized, for example, by clamping circuit which clamps the video signal during the periodic time interval to the value of the control voltage. The control voltage is produced for example, by comparing the modulated FM carrier with a comparison oscillation signal having a frequency corresponding to the constant signal value and a phase which is constant with respect to the line period; the resulting value serves as the control voltage for the periodic time interval.

BRIEF DESCRIPTION OF THE DRAWINGS

FIG. 7 is a table illustrating the change in phase of the chrominance subcarrier of a conventional SECAM signal.

FIG. 8 is a schematic representation of a circuit for shifting the phase of the SECAM chrominance subcarrier to provide a recording thereof according to the invention.

FIGS. 9 and 10 are schematic representations used in explaining the mode of recording a PAL color signal according to the invention.

FIG. 11 is a schematic representation illustrating the mode of recording a TRIPAL color signal on a circular record according to the invention.

DESCRIPTION OF THE PREFERRED EMBODIMENTS

Figure 1:
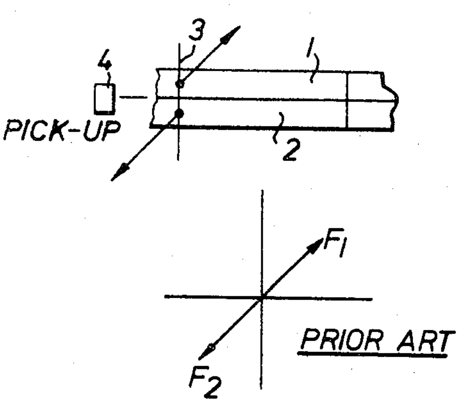
FIG. 1 is a schematic representation illustrating the mode of recording an NTSC color signal according to the prior art.

Referring now to FIG. 1 there is shown a modulated NTSC chrominance subcarrier F which is recorded on adjacently disposed track sections 1, 2 according to the prior art method. Point 3 represents a certain point, e.g., the beginning of lines having the same ordinal for successive frames. Due to the half-line offset in the NTSC chrominance subcarrier and the odd number of lines per frame, the phase of the chrominance subcarrier associated with a certain color is different at this point 3 from picture to picture by 180°, i.e., between track sections 1,2. If the chrominance subcarrier is now modulated with the same signal on sections 1 and 2 at point 3 (same information content for successive pictures) and the pickup 4, because of improper alignment, traces both track sections 1 and 2, information is obtained about the 180° shifted chrominance subcarriers $F_1$ and $F_2$. It can be seen, for example, that in the case when the same amount of signal is obtained from each track, the chrominance subcarriers cancel each other out, i.e., are erased. With other improper positions of pickup 4, phase errors occur in the scanned chrominance subcarrier which produce errors in the color hue.

Figure 2:
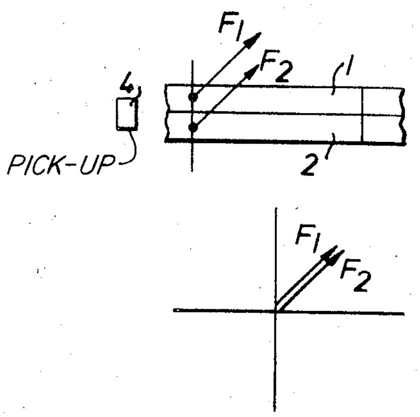
FIG. 2 is a schematic representation illustrating the mode of recording an NTSC color signal according to the invention.

As shown in FIG. 2, according to the invention, the half-line offset of the chrominance subcarrier is cancelled so that the carriers $F_1$ and $F_2$ have the same phase, i.e., the signals on both sections 1 and 2 are identical in the above sense. With this arrangement, it can easily be seen that if pickup 4 now traces over both track sections 1 and 2, chrominance subcarriers of the same phase will be detected and the above-described color distortion will not appear.

Figure 3:
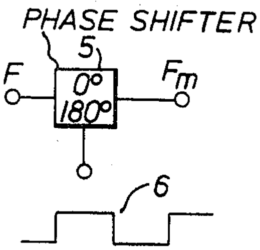
FIGS. 3–5 are schematic block circuit diagrams illustrating various embodiments of apparatus according to the invention for producing the recordings according to FIG. 2.

In order to provide a recording as illustrated in FIG. 2, as shown in FIG. 3, the chrominance subcarrier F is converted in a phsse shifter 5 into the chrominance subcarrier $F_m$, where $F_m$ represents the chrominance subcarrier as modified for recording according to the invention. The phase shifter 5 is controlled by a half-line frequency switching voltage 6 and shifts the phase of the chrominance subcarrier F in the chronologically second line by 180°. This shifting has the effect of cancelling the 180° phase shift caused by the half-line offset, and consequently the chrominance sub-carrier has the same phase from line to line for a certain color at a certain point in the line and thus also for adjacent points on track sections 1,2 as in FIG. 2. During playback the appropriate feedback is produced during the demodulation to reinstate the correct phase relationship between the modulated chrominance subcarrier and the reference carrier provided for the demodulation. For example, the offset may be reinstated or the reference carrier may be switched in the manner illustrated in FIG. 3. Switchable phase shifter 5 is thus effective both during recording and playback.

Figure 4:
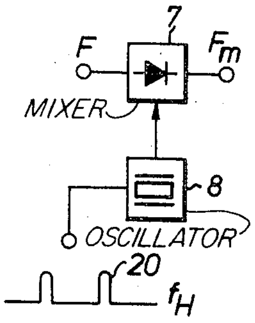

According to the embodiment of FIG. 4, the NTSC chrominance subcarrier F is converted to the subcarrier $F_m$ in a mixer stage 7. The mixer stage 7 is controlled by the output of an oscillator 8 whose frequency is so dimensioned and is coupled by line sync pulses 20 with the line frequency $f_H$ so that the frequency of the chrominance subcarrier $F_m$ is a whole number multiple of the line frequency $f_H$. Generating $F_m$ in this manner meets the requirement according to FIG. 2. During playback the demodulation is then made with a reference carrier at this new frequency.

Figure 5:
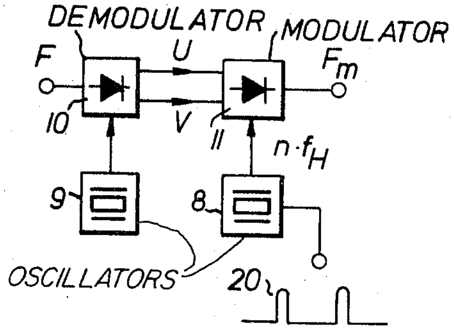

According to the embodiment of FIG. 5, prior to recording, the chrominance subcarrier F is demodulated in a synchronous demodulator 10 which is controlled by a reference carrier oscillator 9. The two resulting video frequency color signals U and V are modulated in a modulator 11 onto a new chrominance subcarrier produced in an oscillator 8. As in FIG. 4, oscillator 8 is again controlled by the line sync pulses 20 and produces a chrominance subcarrier at a whole number multiple $n \cdot f_H$ of the line frequency. During playback, the combination is again made with a reference carrier at this new carrier frequency.

Figure 6:
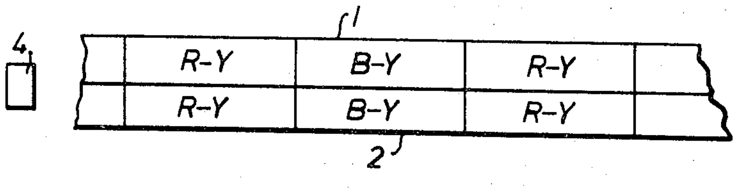
FIG. 6 is a schematic representation illustrating the recording of the color difference signals for a SECAM color signal according to the invention.

FIG. 6 illustrates a SECAM signal according to the invention and contains, on adjacent track sections 1, 2, identical color difference signals, i.e., for example, R–Y or B–Y at video frequency or as a chrominance subcarrier modulation. The pickup 4 thus finds identical color difference signals, when as a result of misalignment it traces two track sections 1,2 or when it alternates between the track sections, so that no significant color hue errors will occur.

FIG. 7 however illustrates a further condition which must be met in the standard SECAM color television signal. In this system the association of a particular frequency and of the modulation phase to the line period is already determined by the signal. As shown in FIG. 7, however the phase of the SECAM chrominance subcarrier is shifted between 0° and 180° in particular lines according to the illustrated sequence. For example, FIG. 7 shows that the chrominance subcarriers in the lines with the spatial ordinal 1 have a different phase between the half frames 3 and 5 recorded on adjacent track sections. According to the present invention, apparatus is provided, e.g., the apparatus shown in FIG. 3, to shift the phase marked $\pi$ in FIG. 7 into the phase 0°. The control of this shift can be effect by the unmodulated chrominance subcarrier oscillations transmitted at the beginning of each line which are shifted in frequency from line to line or by the SECAM identification signal transmitted during the vertical scanning period.

FIG. 8 shows a circuit for providing this phase shift. The SECAM chrominance subcarrier F is fed to the primary of a transformer 12 whose secondary winding has its center tap connected to ground. The ends of the secondary winding are connected via a switch 13 consisting of four diodes connected as shown, to the primary winding of a transformer 16. By means of a switching voltage 17 applied across a terminal 14 connected to the center tap of the primary winding of transformer 16 it is possible to effect the desired phase shift. The desired modified SECAM chrominance subcarrier $F_m$ is taken from a terminal 15 connected to the secondary winding of transformer 16. The illustrated switching voltage 17 applies, for example, for the chronologically successive lines 1, 3, 5, 7, 9, 11 of the half-frame 1. However, the total switching voltage is such that whenever the illustrated phase of the chrominance subcarrier F is $\pi$, i.e. 180°, the switching voltage has a positive value and switches the phase by 180° to 0°. The modified SECAM chrominance subcarrier $F_m$ then always has the same phase for a certain color in adjacent points on adjacent track sections. For the color reproduction a reciprocal switch is required only when the reproduced signal must also be compatible.

When the chrominance subcarrier is a PAL color television signal, the quarter-line offset and the 25 Hz shift of the chrominance subcarrier are removed in the same manner as the half-line offset in the NTSC signal according to FIGS. 1–5. This can be done again with one of the circuits according to FIGS. 3, 4 and 5. It is then assured that the chrominance subcarrier for the modulation axis B–Y, i.e., the chrominance subcarrier which is modulated only with the color difference signal B–Y, has the same phase at the same points in all lines. In the PAL signal the present invention also considers the PAL shift, i.e. the line frequency shift of the R–Y axis.

The manner in which this is done will be explained with FIGS. 9 and 10. In FIG. 9 it is assumed that the quarter-line offset and the 25 Hz shift have already been cancelled, for example by means of a circuit according to FIG. 4, which is indicated by $F_m$. In the recording of the PAL signal the chrominance subcarriers recording on adjacent track sections 1, 2 would then be $F_m$ and $F_m$*, reference being made, for example, to the beginning of each line. Thus, conjugate complex chrominance subcarriers are disposed on adjacent track sections 1, 2. If the pickup 4 now simultaneously traces or scans both track section 1 and track section 2, for example, or alternates therebetween, the chrominance subcarriers $F_m$ and $F_m$* will be averaged, so that according to FIG. 9, in reality chrominance subcarrier $F_t$ is being scanned. It can easily be seen that this is a chrominance subcarrier which has the incorrect phase.

As shown in FIG. 10, however according to the present invention PAL chrominance subcarriers of the same PAL switching state are recorded in adjacent track sections 1, 2, i.e. either only $F_m$ or only $F_m$*. If pickup 4 now traces over both track sections 1 and 2, it finds chrominance subcarriers of the same phase for the same information content so that the color distortion occurring in FIG. 9 does not occur. Thus, three factors must be considered or compensated for in the PAL signal, i.e. the, quarter-line offset, the 25 Hz shift and the PAL shift according to FIG. 9. The important thing here too is that the chrominance subcarrier for the same color hue has the same phase on adjacently disposed points of adjacent track sections.

FIG. 11 illustrates the use of the present invention for a line sequential TRIPAL signal on a circular recording carrier (picture record). On a spiral-shaped track 18 the color signals R, G, B representing the three basic colors are recorded in consecutive lines, the track sections assigned to the lines lying next to one another in a radial direction. The line sync pulses for the signal here lie on radial lines 19. According to the present invention, track sections lying next to one another in the radial direction always contain color signals for the same basic color, e.g. R, G, OR B. When pickup 4 does not have the correct radial position as shown for pickup 4', but rather the position shown by pickup 4 and thus traces over two adjacent track sections 1, 2, no significant errors are produced because the color signals which are recorded in these track sections represent the same basic colors. Even if a flutter in the radial direction causes pickup head 4 to alternate between two track sections 1, 2, no significant errors are produced.

The association of the color picture signals to the track sections as provided by the present invention can also be realized if the color picture signal receives a particular shift in time. For example, the modulated chrominance subcarrier of FIG. 1 could be delayed by one line period during the duration of each second frame, so that the desired phase conditions according to FIG. 2 are obtained. This delay can also be effected for the SECAM signal according to FIG. 6 and for the PAL signal according to FIGS. 9 and 10. If, for example, in FIG. 9 track sections 1, 2 are assigned to consecutive frames and the sequence of chrominance subcarriers F is delayed by one line period during the frame assigned to track section 2, the desired association according to FIG. 10 is obtained. With this shift in time it is also possible to obtain the association according to the present invention of the color signals representing the individual basic colors as shown in FIG. 11 for the TRIPAL color signal. This time shift between the sequence of color picture signals and track sections can also be realized by an adapted control of the movement of the recording carrier.

The color picture signal may be recorded together with the luminance signal, particularly in different frequency positions. For example, a chrominance subcarrier of 500 kHz which has been modulated with two color difference signals and a carrier with a sweep range of 3 to 4 MHz which has been frequency modulated with the luminance signal can be recorded on the same track. The present invention can also be employed for line sequential methods in which the luminance signal and the coded color signals are recorded so that they alternate from line to line.

Figure 12:
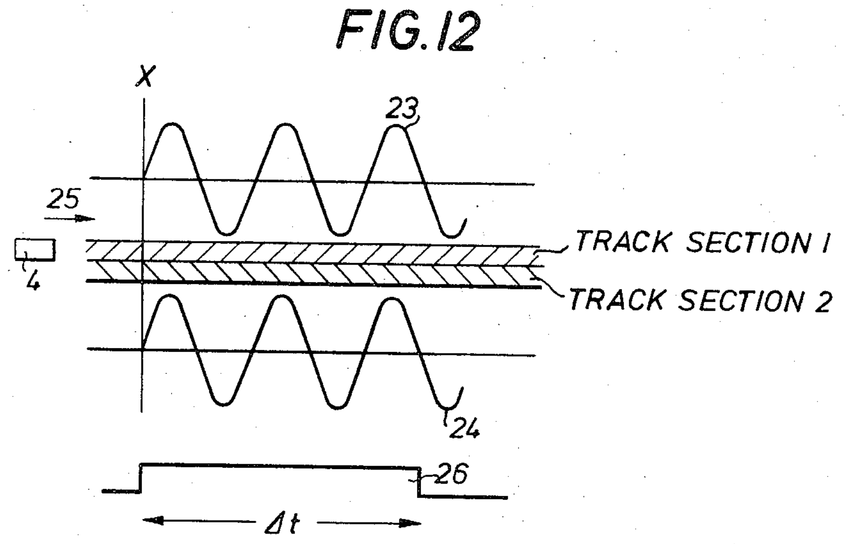
FIG. 12 is a schematic representation illustrating a recording according to a further embodiment of the invention for a frequency modulated carrier.

FIG. 12 again shows two track sections 1, 2 which are disposed next to one another, for example, in the radial direction on a spiral-shaped track of a picture record. Point X of track sections 1 and 2 indicates the beginning of a line of the recorded image. An FM carrier 23 is recorded on track section 1 and an FM carrier 24 is recorded on track section 2. The signals have a constant value during the period $\Delta t$ which corresponds to the porch, i.e., the black value. According to a further embodiment of the present invention, a control initiated by a keying pulse 26 assures that carriers 23, 24 are set to a constant frequency during time $\Delta t$, which frequency corresponds to the signal value during time $\Delta t$, and also to a constant phase with respect to the line period. This is illustrated in FIG. 12 by the fact that both carriers 23 and 24 have a phase of 0° at point X. With this control, which is maintained during the line scanning period by means of a memory circuit shown in FIG. 13, the adjacently recorded carriers 23, 24 have the same frequency during the line scanning period following time $\Delta t$ and the same phase with respect to the line period. If now a pickup 4, which moves across track sections 1, 2 in direction 25, scans signal components from both track sections 1 and 2, it will find carriers at the same frequency and with the same phase. Thus interferences are substantially eliminated. Carriers 23, 24 may be modulated with a luminance signal Y, a color signal R, G, B or with a chrominance subcarrier F.

Figure 13:
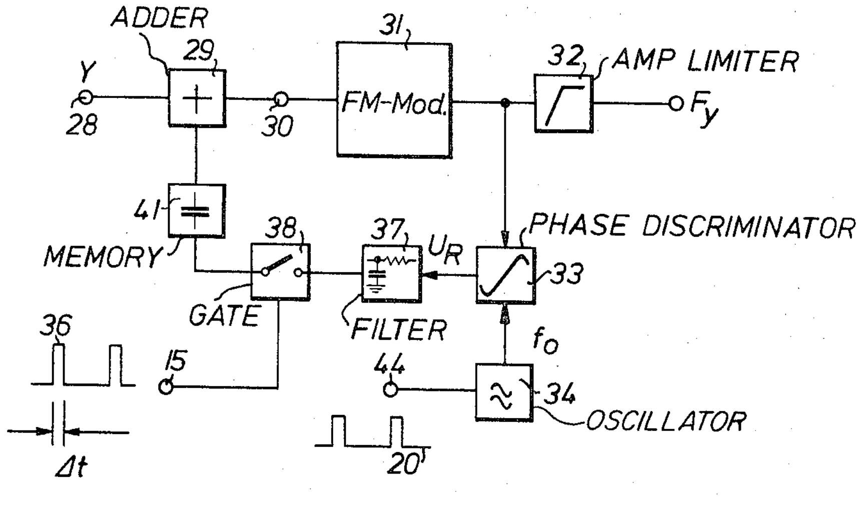
FIG. 13 is a block circuit diagram of an apparatus according to the invention for producing the recording of FIG. 12.

FIG. 13 shows an embodiment of the control circuit for providing the signals according to FIG. 12. The luminance signal Y to be recorded as fed via a terminal 28 through an adder stage 29 to a modulation input 30 of an FM modulator 31 which furnishes at its output, via an amplitude limiter 32, a carrier $F_y$ which is frequency modulated with signal Y and which is recorded in a known manner. The frequency of carrier $F_y$ is thus always equal to the momentary value of signal Y. According to the further embodiment of the present invention, the modulated carrier $F_y$ is compared in a discriminator 33 with a comparison oscillation $f_o$. This comparison oscillation is generated in an oscillator 34 which is controlled with line sync pulses 20 of signal Y fed thereto via a terminal 44. The line sync pulses 20 may be derived from signal Y or taken from a clock pulse generator. Pulses 20 produce a comparison oscillation $f_0$ in oscillator 34 with a frequency corresponding to the signal value Y during the time period $\Delta t$ and a phase which is constant with respect to the line period. Oscillator 34 may be a start-stop oscillator or a lockable oscillator which is always started at the same phase by the line sync pulse 20. The control voltage $U_R$ generated in discriminator 33 is fed, via a filter 37, a gate 38 and a memory circuit 41, to an input of adder stage 29. Gate 38 is enabled during time $\Delta t$ by the scanning pulse 36. Memory circuit 41 is so designed that the control voltage appearing at the output of gate 38 is rapidly stored with a time constant which is low compared to the horizontal flyback time. At the output of memory circuit 41 there is thus produced a control voltage which adjusts FM modulator 31 to the proper frequency and phase during time $\Delta t$. This control voltage is always quickly corrected during the flyback time and then remains the same during the line-scanning period. In the adder stage 29 signal Y which effects the frequency modulation is superimposed on this control voltage. Memory circuit 41 may be, for example, a clamping circuit in which the control voltage present during this time is clamped.

A circuit that may perform the functions of circuits 41,29,31 in FIG. 13 is more fully described in the German journal "Jahrbuch des elektrischen Fernmeldewesens 1969" von Dr. H. Pau sch, Verlag fur Wissenschaft und Leben G. Heidecker, page 264 – 266,especially FIG. 16.

It will be understood that the above description of the present invention is susceptible to various modifications, changes and adptations, and the same are intended to be comprehended within the meaning and range of equivalents of the appended claims.

I claim:

1. In a recording system for recording color video signals including means for recording the color video signals along a track on a storage medium in a manner whereby track sections which are assigned to spatially identical points of successive frame lie next to one another on said storage medium, the improvement comprising: means, connected to said recording means, for converting at least one selected parameter of the modulated chrominance subcarrier to be recorded so that identical color signals with respect to the selected parameters are recorded on adjacent track sections.

2. Device as defined in claim 1 wherein the color signal to be recorded is a chrominance subcarrier (F) of the SECAM signal type and wherein said converting means comprises a periodically switched phase shifting means connected in the signal path of said chrominance subcarrier (F) for periodically shifting the phase of the chrominance subcarrier to cancel the phase shift thereof existing in certain half-frames between lines having the same spatial ordinal.

3. The apparatus defined in claim 1 further comprising playback means including decoding circuit means adapted to decode each line of the recorded color picture signal received from the storage medium during playback to reconvert the selected parameter to its original state.

4. The apparatus defined in claim 1 wherein the color picture signal and a luminance signal are recorded along the same track in the form of separate frequency modulated carrier wave trains produced by respective frequency modulations; said apparatus further including means for controlling the frequency modulator for the luminance signal so that the frequency modulated luminance carrier, prior to recording, and during a periodically repeated time period ($\Delta t$) which corresponds to a constant signal value, i.e., the black value, has a constant frequency and defined phase with respect to the line period so that the recorded luminance carriers in adjacently disposed track sections have the same signal value and the same defined frequency and phase with respect to the line period.

5. The apparatus defined in claim 4 wherein said means for controlling the frequency modulator for the luminance signal includes a memory circuit means for applying a control voltage to the modulation input of a respective one of said frequency modulators, said memory circuit means having a time constant which is low compared to the horizontal flyback time so as to permit a rapid change of the control voltage stored therein during the periodic time period ($\Delta t$) and maintain the control voltage during the subsequent line-scanning period.

6. The apparatus defined in claim 5 wherein said memory circuit means is a clamping circuit which clamps the video signal to the value of the control voltage during the time period ($\Delta t$).

7. The apparatus defined in claim 5 wherein said means for controlling the frequency modulator further includes:

a reference oscillator means controlled by line sync pulses for providing a reference oscillation signal having a phase which is constant with respect to the line period;

a phase comparison circuit means for comparing the output signal from said reference oscillator means and said frequency modulator and for producing an output voltage proportional to the difference; and gate means for applying the output signal from said phase comparison circuit means to said memory means during each periodically repeated time period $\Delta t$.

8. The apparatus defined in claim 1 wherein the chrominance subcarrier to be recorded is one whose frequency is coupled with the picture line frequency in a $l/n$ line offset, and wherein said converting means comprises switching means for altering the phase of the chrominance subcarrier so that the phase associated with a certain color is the same for adjacent points on two adjacent track sections.

9. The apparatus defined in claim 8 wherein the color signal to be recorded is a chrominance subcarrier of the NTSC type; and wherein said switching means comprises a phase shifter connected in the signal path of the chrominance subcarrier, and means for causing said phase shifter to shift the phase of said chrominance subcarrier by 180° for alternate picture lines.

10. The apparatus defined in claim 8 further comprising playback means including decoding circuit means adapted to decode each line of the recorded color picture signal received from the storage medium during playback to reconvert the selected parameter to its original state; and wherein said decoding means comprises a periodically switched phase shifter connected in the signal path of the chrominance subcarrier received from the storage medium during playback.

11. The apparatus defined in claim 8 wherein said switching means comprises means for changing the frequency of the chrominance subcarrier to a whole number multiple of the line frequency.

12. The apparatus defined in claim 11 wherein said means for changing the frequency of the chrominance subcarrier comprises means for demodulating the chrominance subcarrier and means for modulating a carrier having a frequency which is a whole number multiple of the line frequency with the demodulated color signals.

13. The apparatus defined in claim 11 wherein the color signal to be recorded is a chrominance subcarrier of the PAL signal type and wherein said switching means changes the frequency of the chrominance subcarrier to a whole number multiple of the line frequency thereby cancelling the quarter-line offset and the 25 Hz shift.

14. The apparatus defined in claim 11 further comprising playback means including decoding circuit means adapted to decode each line of the recorded color picture signal received from the storage medium during playback to reconvert the selected parameter to its original state; and wherein said decoding means includes means for mixing the chrominance subcarrier signal received from the storage medium during playback with a reference carrier adapted in each line to the respective modulation frequency and modulation phase of the recorded chrominance subcarrier.

15. The apparatus defined in claim 14 wherein said decoding means includes periodically actuated phase shifting means for shifting the phase of the reference carrier between the lines.

16. The apparatus defined in claim 11 wherein said means for changing the frequency of the frequency of the chrominance subcarrier includes means for mixing the chrominance subcarrier with a signal having a frequency which has a fixed relationship to the line frequency.

17. The apparatus defined in claim 16 wherein said signal having a frequency which has a fixed relationship to the line frequency is produced by an oscillator which is controlled by line sync pulses.

18. In a method of recording color picture signals including the step of recording the color picture signals along a track on a storage medium in a manner whereby track sections which are assigned to spatially identical points of successive frames lie next to one another on the storage medium, the improvement comprising:

prior to said step of recording, modifying the color picture signal so that color picture signals which are the same with respect to the selected parameter thereof are disposed on adjacent track sections.

19. The method defined in claim 18 wherein the color picture signal to be recorded is of the three line sequential color picture signal (TRIPAL) type wherein the basic color represented is different from line to line, and wherein said step of modifying comprises shifting of the color picture signal in time relative to the movement of the recording carrier so that color picture signals representing the same basic color will be recorded on adjacent track sections.

20. The method defined in claim 18 wherein the color signal to be recorded is a chrominance subcarrier of the NTSC signal type and wherein said modifying step comprises shifting the phase of every other line by 180° prior to recording.

21. The method defined in claim 18 wherein the color signal to be recorded is a chrominance subcarrier of the NTSC signal type and wherein said modifying step comprises changing the frequency of the chrominance subcarrier, prior to recording to a frequency which is a whole number multiple of the line frequency.

22. The method defined in claim 18 wherein the color signal to be recorded is a chrominance subcarrier of the PAL signal type and wherein said modifying step comprises: controlling the time position of the signal sequence in each half-frame so that adjacent track sections contain the recording of chrominance subcarriers with the same PAL switching state, and, controlling the phase of the chrominance subcarrier in every line so that the modulation phase in adjacent track sections is the same for the same color information.

23. The method defined in claim 22 wherein type and wherein recorded is a chrominance subcarrier of the PAL signal type and wherein said step of controlling the phase comprises changing the frequency of the chrominance subcarrier, prior to recording, to a frequency which is a whole number multiple of the line frequency.

24. The method defined in claim 18 wherein the color signal to be recorded is a SECAM signal and wherein said modifying step comprises controlling the time position of the signal sequence in the individual half-frames so that color difference signals (R – Y, B – Y) which represent the same color are recorded in adjacent track sections.

25. The method defined in claim 24 wherein the color signal to be recorded is a modulated chrominance subcarrier of the SECAM type and wherein said step of modifying further comprises controlling the phase of the chrominance subcarrier in every line so that the phase is the same for adjacent recorded track sections.

* * * * *